SEARCH ROO

March 4, 1969 R. V. O'DONNELL 3,431,496

JAMMING TRANSCEIVER WITH AUTOMATIC FREQUENCY TRACKING
OF JAMMED SIGNAL
Filed May 27, 1966

INVENTOR,
RICHARD V. O'DONNELL.

BY Harry M. Saragovitz, Edward J. Kelly, Herbert Berl & Julian C. Keppler

ATTORNEYS

United States Patent Office 3,431,496

Patented Mar. 4, 1969

3,431,496

JAMMING TRANSCEIVER WITH AUTOMATIC FREQUENCY TRACKING OF JAMMED SIGNAL

Richard V. O'Donnell, Freehold, N.J., assignor to the United States of America as represented by the Secretary of the Army Filed May 27, 1966, Ser. No. 554,296

U.S. Cl. 325—132 8 Claims

Int. Cl. H04k *3/00*

ABSTRACT OF THE DISCLOSURE

In a jamming transceiver the receiver and transmitter are alternately enabled whereby the receiver monitors the signal of the enemy station and said signal is used to automatically adjust the transmitter frequency to track that of the received signal.

The present invention relates to radio jamming equipment and more particularly to a jamming transceiver comprising a receiver for monitoring an enemy station to be jammed and a jamming transmitter. The receiver and transmitter are alternately enabled by a transmit-receive switch, or other equivalent circuitry, usually at an audio or sub-audio rate. While the transmitter is disabled the receiver is enabled so that the signal to be jammed can be monitored and can be used to automatically adjust the transmitter frequency to track that of the received signal. It has been a problem in the prior art equipment of this type to achieve accurate tracking and therefore effective jamming and at the same time provide a transceiver which is easily operated and tuned. The present invention provides a novel jamming transceiver which is superior in both of these respects. Briefly stated, the transceiver comprises a more or less conventional superheterodyne receiver with automatic frequency control (AFC) in which the discriminator output controls the local oscillator frequency. The transmitter includes an intermediate frequency (IF) oscillator with a nominal frequency the same as the receiver IF. The local oscillator is common to both transmitter and receiver and the transmitted carrier is obtained by heterodyning the IF oscillator output with the local oscillator output. Since the received signal frequency is equal to the local oscillator frequency minus the receiver intermediate frequency and the transmitted frequency is equal to the local oscillator frequency minus the intermediate frequency oscillator frequency, any difference between the transmitted and received signal frequencies will be due to differences between the receiver IF and the IF oscillator frequency of the transmitter. The transceiver includes a second AFC circuit for automatically adjusting the IF oscillator frequency to the same value as the receiver IF. The AFC circuit of the receiver simplifies the tuning thereof and also greatly reduces the frequency drift of the receiver intermediate frequency due to drift of the received signal or due to local oscillator drift and therefore permits the use of a narrow band, highly effective AFC circuit for controlling the IF oscillator frequency of the transmitter.

It is therefore an object of this invention to provide a novel and improved jamming transceiver.

Another object of the invention is to provide a jamming transceiver which is easily operated and which accurately tracks the frequency of a signal to be jammed.

A further object of the invention is to provide a jamming transceiver with two automatic frequency control circuits which cooperate to provide simplified tuning of the set and also to provide accurate frequency tracking of a received signal which is to be jammed.

Figure 1:
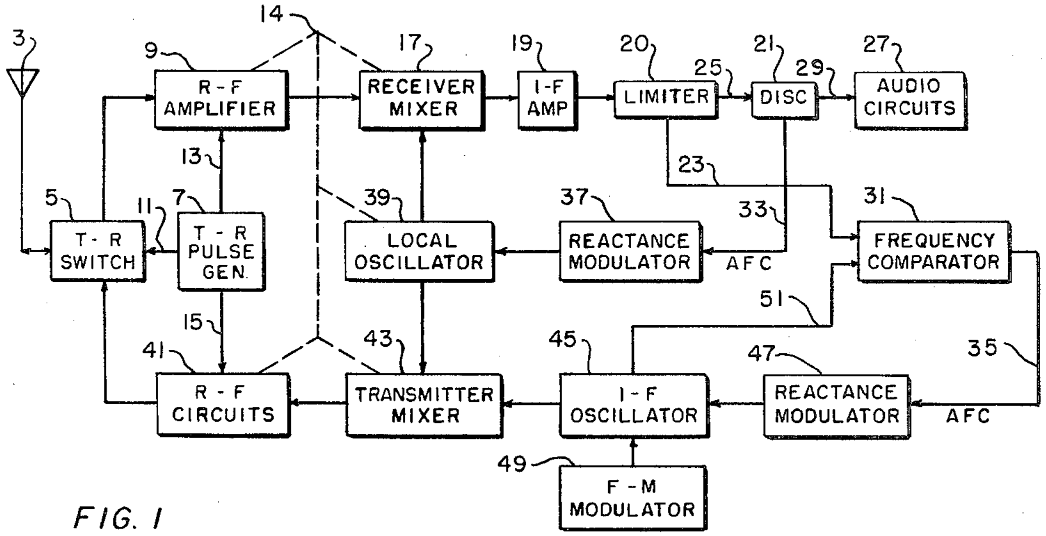
Figure 2:
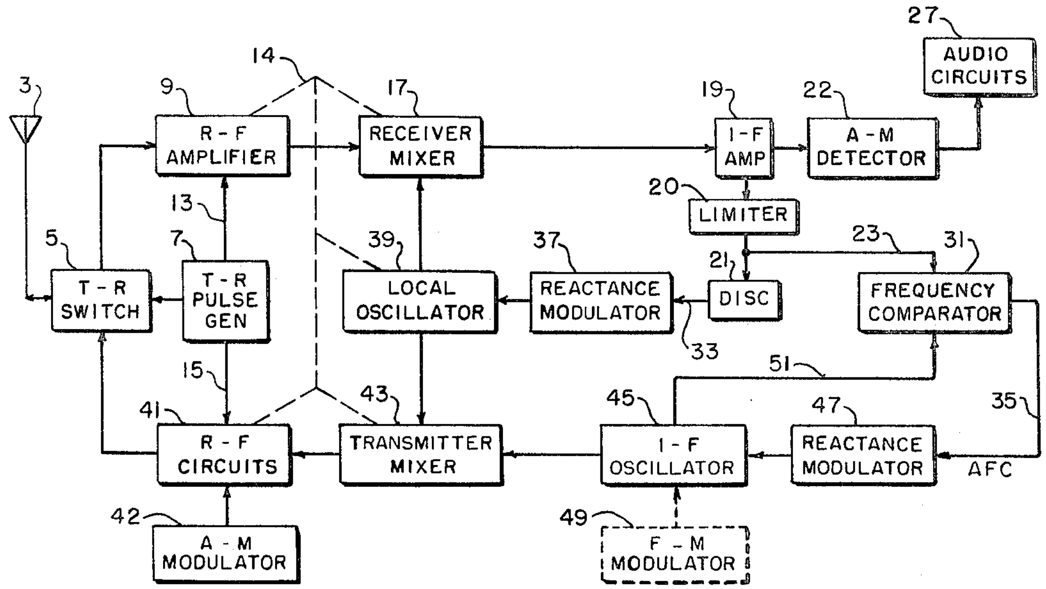

These and other objects and advantages of the invention will become apparent from the following detailed description and drawing, in which:

FIG. 1 is an illustrative embodiment of the invention as applied to a frequency modulated jamming transceiver and, FIG. 2 illustrates how the same invention can be applied to an amplitude modulated jamming transceiver.

In FIG. 1, the antenna 3 is alternately connected to the receiver input comprising radio frequency amplifier 9 and the transmitter output stage comprising radio frequency circuits 41 by means of the transmit-receive switch 5. The operation of the switch 5 is controlled by the output of transmit-receive pulse generator 7. The pulse generator 7 comprises a square wave type oscillator, for example a multivibrator the frequency of which is set at the rate at which the receiver and the transmitter are to be enabled and disabled. One output of pulse generator 7 is applied to the TR switch 5 over lead 11 to control the switching of the antenna. The two other outputs 13 and 15 of generator 7 are applied to the received RF amplifier 9 and the transmitter RF circuits 41 respectively to alternately disable and enable the receiver and transmitter. The duty cycle of the pulse generator 7 is adjusted to give the desired ratio of enabling and disabling for the transmitter and receiver. Normally the transmitter is enabled and the receiver disabled for the majority of the time. The signals on leads 13 and 15 may be complementary biasing signals for disabling one of the transmitter or receiver and enabling the other of the two, synchronously with the switching of the antenna. For example, when the signal on lead 11 switches the antenna to the transmitter, a negative bias on lead 13 would disable the receiver RF amplifier and when the signal on lead 11 switches the antenna to the receiver, a negative bias on lead 15 would disable the transmitter.

The received signal is applied to the mixer 17 from amplifier 9 where it is heterodyned with the output of local oscillator 39. The resultant difference frequency is applied to and amplified by IF amplifier 19, then any amplitude modulation thereon is removed by limiter 20. One output of limiter 20 is applied to discriminator 21 over lead 25 and the other output, lead 23, forms one input of frequency comparator 31. The signal output 29 of the discriminator on lead 29 contains the intelligence or modulation of the received signal and this is applied to audio circuits 27 for monitoring purposes. The second discriminator output on lead 33 comprises the receiver AFC bias which varies in polarity and magnitude depending on the sense and magnitude of the deviation of the receiver intermediate frequency from the center frequency of the discriminator. This bias is applied to a reactance modulator 37 which forms part of the tank circuit of local oscillator 39. The AFC bias functions in a well known manner to automatically adjust the frequency of the local oscillator in such a direction as to bring the receiver intermediate frequency toward the center frequency of the discriminator. The reactance modulator 37 may comprise a reactance tube or a Varicap diode, the capacity of which varies with the DC bias applied thereto.

The transmitter comprises an IF oscillator 45 which has a nominal frequency the same as the center of the receiver intermediate frequency passband, which is the same as the discriminator center frequency. The frequency modulator 49 varies the frequency of the IF oscillator in a desired manner to achieve optimum jamming, for example modulator 49 may include means to apply a random or noise frequency modulation to the transmitted jamming signal. The output of the IF oscillator forms one input of the transmitter mixer 43, the other input of which is the output of the local oscillator 39. The resultant difference frequency is applied to and amplified by the transmitter RF circuits 41, the output of which is applied to the antenna 3 via the TR switch 5. The receiver and transmitter tunable circuits of the RF amplifier 9, the mixer 17, the local oscillator 39, the RF circuits 41 and the mixer 43 are gang-tuned as indicated by the dashed line 14 connecting these circuit elements. The output of the IF oscillator 45 is applied to frequency comparator 31 over lead 51 to form the second input thereof. The output of the frequency comparator is an AFC bias which is applied to reactance modulator 47, which forms part of the tank circuit of oscillator 45. This AFC bias automatically adjusts the IF oscillator toward the frequency of the receiver intermediate frequency.

While the drawing shows the biasing leads 13 and 15 connected only to one stage of each of the transmitter and receiver, in practice it may be necessary or desirable to bias off several stages in order to prevent interference between the receiver and transmitter. For example, the FM modulator 49 may be disabled while the receiver is enabled to prevent the frequency modulation of the IF oscillator 45, which modulation might interfere with the operation of the transmitter AFC circuit.

In operation, the ganged transceiver circuits are manually tuned to a station which is to be jammed. The receiver AFC circuit facilitates this tuning and at the same time maintains the receiver intermediate frequency very close to the center frequency of the discriminator 21 in spite of frequency drift of either the received signal or the local oscillator 39. As stated above, the receiver will normally be disabled for the majority of each cycle of the TR pulse generator 7 and therefore for the majority of the time there will be no received signal. The AFC system of the receiver is therefore of a type which will rapidly lock onto the incoming signal during the period when the receiver is enabled and will also maintain its AFC bias without substantial discharge or leakage during the period when the receiver is disabled and the transmitter enabled. This can be easily achieved with a so-called fast attack, slow release AFC system in which the receiver AFC bias on lead 33 represents the voltage across a capacitor or other charge storing means which is connected to the discriminator output by means of a low impedance or short time constant circuit for rapid charging but is shunted by a high impedance or long time constant circuit for slow discharge. Since the receiver intermediate frequency is held within close limits by the receiver AFC circuit, the transmitter AFC circuit comprising the frequency comparator 31 and reactance modulator 47 can be chosen as the narrow-band type which has a narrow pull-in range, frequencywise, but a high loop gain which results in close frequency tracking of the received intermediate frequency by the IF oscillator. The frequency comparator is of the type which produces an AFC bias voltage proportional to the frequency difference between its two inputs. The transmitter AFC is the slow attack, slow release type which means that it has a relatively long charging time constant compared to the receiver AFC circuit as well as a long discharge time constant, comparable to that of the receiver AFC circuit. This assures that the transmitter AFC circuit does not go into action before the receiver AFC circuit has adjusted the receiver intermediate frequency and also it permits the circuitry to maintain the frequency control in spite of the intermittent nature of the received IF signal. Neither of the AFC circuits respond to the modulation on either the received IF signal or the transmitter IF oscillator.

By properly choosing the frequency of the TR pulse generator 7, it is possible to recover all of the intelligence on the received signal even though the receiver is enabled for only a small percentage of the time. If, for example, the received signal is modulated by speech with frequency components up to 5,000 c.p.s., the frequency of the pulse generator 7 would be adjusted to the so-called Nyquist frequency of twice the highest speech frequency component or 10,000 c.p.s. The output of the discriminator 21 on lead 29 would then comprise a train of amplitude modulated pulses with a repetition rate of 10,000 c.p.s., the envelope of which would comprise the speech modulation. The audio circuits 27 would then include means to recover the envelope of the train of amplitude modulated pulses.

FIG. 2 shows the invention as applied to an amplitude modulated transceiver. The overall circuitry is similar to that of FIG. 1 and functions in a similar manner. Circuit elements of FIG. 2 which correspond to those of FIG. 1 bear the same reference numerals and hence no detailed description of these circuit elements is necessary. As can be seen in FIG. 2, the limiter 20 and discriminator 21 do not form part of the signal channel of the receiver but do form part of the receiver AFC circuit. The output of the IF amplifier 19 is applied to limiter 20 and to amplitude modulation detector 22, where the intelligence thereon is recovered. The transmitter is modulated by means of amplitude modulator 42 connected to the transmitter RF circuits 41. In certain cases it is advantageous to jam an amplitude modulated signal with a frequency modulated signal. The transmitter of FIG. 2 in such cases can be frequency modulated by utilizing an FM modulator 49, shown in dashed outline, in place of the AM modulator 42.

The manner in which the transceivers of FIGS. 1 and 2 track an enemy signal will now be illustrated with numerical examples. It will be assumed that the transceiver is tuned to receive and transmit signals at 60 megacycles (mc.), the nominal intermediate frequency of both receiver and transmiter is 10 mc. resulting in a nominal local oscillator frequency of 70 mc. If the received signal should drift upward in frequency by 10 kilocycles (kc.) to 60,010 kc., the receiver intermediate frequency would drop by an equal amount to 9,990 kc. in the absence of any receiver automatic frequency control. If it is assumed that each of the AFC circuits has a 10 to 1 correction factor the frequency errors will be reduced to 10% of the uncontrolled value by each AFC circuit. The controlled receiver intermediate frequency would then be 999 kc. with a controlled local oscillator frequency of 70,009 kc. In the absence of the transmitter AFC circuit and assuming that the IF oscillator is at its nominal frequency of 10 mc., the transmitted frequency would be 70,009 kc. minus 10,000 kc. or 60,009 kc. which is 1 kc. lower than the received signal frequency. Thus the receiver AFC circuit acting alone brings the transmitted signal to within 1 kc. of the received signal of 60,010 kc. With the transmitter AFC operating, the 1 kc. difference between the receiver intermediate frequency and the transmitter IF oscillator frequency would be reduced to 100 c.p.s., with the assumed 10 to 1 correction factor of the transmitter AFC circuit, resulting in a controlled transmitter IF oscillator frequency of 9999.1 kc. The transmitted frequency would then be 70,009 kc. minus 9999.1 kc. or 60,009.9 kc. which is 100 c.p.s. below the received signal frequency. Thus the two AFC circuits with individual correction factors of 10 to 1 result in a composite correction factor of 100 to 1. The same composite correction factor obtains if the local oscillator is tuned away from its nominal value due either to drift or transceiver mistuning. Assume that there is no error or drift in the incoming signal of 60 mc. but that the uncontrolled local oscillator frequency is 10 kc. high or 70,010 kc. due to one of the aforementioned causes. This would raise the transmitted frequency by 10 kc. in the absence of both AFC circuits. The receiver AFC circuit alone however would reduce the local oscillator error to 1 kc., yielding a local oscillator frequency of 70,001 kc. and a received intermediate frequency of 10,001 kc. This would yield a transmitted frequency of 70,001 kc. minus 10,000 kc. or 60,001 kc. in the absence of the transmitter AFC circuit. With the transmitter AFC circuit operating, the intermediate frequency oscillator would be controlled to 10,000.9 kc. or within 100 c.p.s. of the controlled received intermediate frequency. Thus the transmitted frequency would be 70,001 kc. minus 10,000.9 kc. or 60,000.1 kc. which again differs from the assumed received signal frequency by only 100 c.p.s. The circuitry also corrects for drift of the discriminator tuning. Assume that the discriminator center frequency drifts upward by 1 kc. to 10,001 kc., with a received signal of 60 mc. and a nominal uncontrolled local oscillator frequency of 70 mc. In the absence of both AFC circuits the receiver intermediate frequency would be 10,000 kc., however, the receiver AFC would adjust this signal to 10,000.9 kc. by raising the local oscillator to 70,000.9 kc. The transmitter AFC circuit would then raise the intermediate frequency oscillator to 10,000.81 kc. by correcting 90% of the uncontrolled error between the two intermediate frequency signals. The transmitted frequency would then be 70,000.9 minus 10,000.81 kc. or 60,000.09 kc. Thus a 1 kc. error in the discriminator tuning causes only a 90 c.p.s. difference between received and transmitted signals.

While the transceivers of FIGS. 1 and 2 have been illustrated as utilizing a common antenna by means of a transmit-receive switch, separate antennas for the transmitter and receiver suitably shielded or isolated from each other could be used. While the invention has been described as applied to a jamming transceiver, the inventive concepts of the invention may be applied to other types of transceivers, for instance communications transceivers.

While the invention has been illustrated in connection with illustrative embodiments and numerical examples, the inventive concepts disclosed herein are of general application. Accordingly, the invention should be limited only by the scope of the appended claims.

What is claimed is:

1. A jamming transceiver comprising a superheterodyne receiver and a transmitter for alternately monitoring a signal to be jammed and for transmitting a jamming signal, said transceiver comprising an antenna and a transmit-receive switch for alternately connecting said antenna to said receiver and to said transmitter, a pulse generator connected to and controlling said transmit-receive switch, said pulse generator also being connected to said receiver and said transmitter and arranged to enable said receiver and disable said transmitter while said antenna is connected to said receiver and to enable said transmitter and disable said receiver while said antenna is connected to said transmitter, said transceiver comprising a local oscillator common to said receiver and said transmitter; said receiver comprising a radio frequency amplifier connected to said transmit-receive switch, a mixer for heterodyning the output of said local oscillator with the output of said radio frequency amplifier to obtain a difference intermediate frequency signal, means to amplify and to demodulate said intermediate frequency, a first automatic frequency control circuit comprising a discriminator the input of which is said intermediate frequency signal and a reactance modulator controlled by the output of said discriminator, said reactance modulator controlling the frequency of said local oscillator; said transmitter comprising, an intermediate frequency oscillator nominally tuned to the same frequency as said receiver intermediate frequency, a transmitter mixer the inputs of which are the outputs of said intermediate frequency oscillator and said local oscillator, radio frequency circuits connected to the output of said transmitter mixer and tuned to the difference between the frequencies of said local oscillator and said intermediate frequency oscillator, the output of said radio frequency circuits being connected to said antenna via said transmit-receive switch; said transceiver further comprising a second automatic frequency control circuit for comparing the frequency of said receiver intermediate frequency signal to that of said intermediate frequency oscillator and for automatically adjusting the frequency of said intermediate frequency oscillator toward that of said receiver intermediate frequency signal.

2. The transceiver of claim 1 in which said receiver and said transmitter are frequency modulated.

3. The transceiver of claim 1 in which said receiver and said transmitter are amplitude modulated.

4. The transceiver of claim 1 in which said receiver is amplitude modulated and said transmitter is frequency modulated.

5. A jamming transceiver comprising a superheterodyne receiver and a transmitter which are alternately enabled to alternately monitor a received signal to be jammed and to transmit a jamming signal, said transmitter being enabled for the majority of the time, said transceiver comprising a local oscillator common to said receiver and said transmitter, said receiver comprising means to heterodyne said received signal with the output of said local oscillator to obtain a difference intermediate frequency signal, a first automatic frequency control system including a discriminator the input of which is said intermediate frequency signal and a reactance modulator controlling said local oscillator frequency in response to an output of said discriminator; said transmitter comprising an intermediate frequency oscillator with a nominal frequency the same as the receiver intermediate frequency, means to heterodyne the output of said intermediate frequency oscillator with said local oscillator to obtain said jamming signal as the difference frequency therebetween, and a second automatic frequency control circuit for comparing said receiver intermediate frequency and said transmitter intermediate frequency and for automatically adjusting the frequency of said intermediate frequency oscillator toward that of said receiver intermediate frequency signal.

6. The transceiver of claim 4 wherein said transmitter is enabled for the majority of the time and wherein said first automatic frequency control circuit is of the fast attack, slow release type which is capable of rapidly locking onto said received signal while said receiver is enabled and will also maintain said local oscillator at its controlled frequency in the absence of the received signal while said receiver is disabled, and wherein said second automatic frequency control circuit is of the slow attack, slow release type which permits said first automatic frequency control circuit to act faster than said second automatic frequency control circuit but will maintain control of said intermediate frequency oscillator in the absence of said received signal while said receiver is disabled.

7. A jamming transceiver comprising a superheterodyne receiver and a transmitter which are alternately enabled to alternately monitor a received signal to be jammed and to transmit a jamming signal, said transceiver comprising an intermediate frequency oscillator and a single local oscillator for heterodyning said received signal to a difference received intermediate frequency and for heterodyning the output of said intermediate frequency oscillator to obtain a difference frequency comprising said jamming signal, a first automatic frequency control circuit for adjusting the frequency of said local oscillator in such a direction as to maintain said received intermediate frequency at a fixed value in spite of received signal drift or transceiver mistuning, and a second automatic frequency control circuit for causing said intermediate frequency oscillator to track the frequency of said receiver intermediate frequency.

8. The transceiver of claim 6 wherein said receiver is disabled and said transmitter enabled for a majority of the time and wherein said received signal is modulated, means for alternately enabling and disabling said receiver and transmitter at a rate of at least twice that of the highest frequency component of the modulation on said received signal, said transceiver further comprising means to demodulate said received intermediate frequency to obtain a train of amplitude modulated pulses, and further means to recover the envelope of said train of pulses.

References Cited

UNITED STATES PATENTS

| | | | |
|---|---|---|---|
| 2,317,547 | 4/1943 | McRae | 325—20 |
| 2,427,523 | 9/1947 | Dolberg | 325—22 |
| 2,550,519 | 4/1951 | Bataille | 325—18 |
| 2,653,315 | 9/1953 | Wheeler | 325—20 |
| 2,747,083 | 5/1956 | Guanella | 325—132 |
| 2,846,572 | 8/1958 | Elliott | 325—20 |

ROBERT L. GRIFFIN, *Primary Examiner.*

A. J. MAYER, *Assistant Examiner.*